United States Patent Office 2,699,418
Patented Jan. 11, 1955

2,699,418

PROCESS OF APPLYING LITHIUM CYANATE TO MITES

William P. Ter Horst, Lewiston, N. Y., assignor to Olin Mathieson Chemical Corporation, a corporation of Virginia No Drawing. Application December 1, 1950, Serial No. 198,735

1 Claim. (Cl. 167—14)

My invention relates to lithium cyanate as a new composition of matter. Although other alkali metal cyanates are known, lithium cyanate as such is not mentioned in the literature and so far as I know has not been prepared. The reason for this may be connected with the instability of lithium cyanate in preparation or may be the difficulty of preparing lithium cyanate by a practical method in a form suitable for use in commerce. I have discovered however that lithium cyanate of good purity and stability may be produced by reaction of urea and lithium carbonate.

I also have found that lithium cyanate is an excellent miticide. For example, tests for contact miticidal activity show that excellent control is provided, e. g. 90 to 100 per cent kill of two-spotted spider mites. Because of its high level of activity, lithium cyanate advantageously is used in dilute admixture, usually in the form of a dust or spray of say 0.25 to 2.0 weight per cent concentration in clays, water or other insecticidal base materials.

An excellent method for producing lithium cyanate is described in my pending application Serial No. 196,940 filed November 21, 1950. According to the method of that application, urea and lithium carbonate in a molar ratio of 2 and 3 moles urea to one mole lithium carbonate are heated to a clear melt. By clear melt is meant the molten state obtained by application of sufficient heat to carry the reaction mixture through the initial fusion of the urea, the suspension of the carbonate therein, on through the stage where the mixture rehardens to a solid agglomerate and finally melts to a clear fusion which is obtained at about 600° C. It is essential to remove the molten product as rapidly as possible from the reaction zone once the clear melt state is obtained. In this way, a product of high cyanate content is obtained. Formation of undesirable cyanide by decomposition is minimized. The apparatus employed should be adapted for rapid heating and rapid removal of the fused product from the reaction. For example, a solid mixture of the reactants may be fed into the upper part of an inclined heated tube provided with means such as a screw conveyor for moving the solid through the tube as rapidly as possible into the heated center zone of the tube. The tube is arranged so that the fused liquid flows immediately into the lower and cooler part of the tube and thence out of the tube. Moisture is driven off as the urea melts (85° to 120° C.) but sublimation or volatilization of the urea should be avoided. The reaction mixture should be heated to a minimum temperature at which the clear melt is formed, and the reaction time in the clear molten state advantageously is limited to about 2 to 5 minutes. The preparation of lithium cyanate is illustrated in the following specific example.

A powdered mixture of 73.9 parts of lithium carbonate (1.0 mole) and 150 parts of urea (2.5 moles) was added in portions from time to time to a nickel vessel having a spout at the bottom. The powdered mixture was added at such a rate that the vessel was always filled with solid. Heat was supplied to the vessel by means of gas firing, and the fusion was flowed as fast as formed from the spout into a suitable container. The fusion temperature was 600° C. The yield was 86.5 per cent of LiOCN.

The product as produced has a melting point of 580° to 600° C. It is white in color and is characterized by the monoclinic crystal form. The salt is somewhat hygroscopic and has a solubility in water of 67.5 grams in 100 ml. at 25° C. After recrystallization from water, a typical sample of the product by Volhard titration analyzed 90.13 per cent LiOCN and 14.26 per cent lithium. The theoretical lithium content is 14.0 per cent.

I claim:

The process of killing mites which comprises applying to a mite infested object a mixture comprising lithium cyanate and an insecticidal base material in which the lithium cyanate is present in an amount of about 0.25 to 2.0 weight per cent.

References Cited in the file of this patent

UNITED STATES PATENTS

| | | |
|---|---|---|
| 1,557,758 | Fulton | Oct. 20, 1925 |
| 1,560,558 | Fulton | Nov. 10, 1925 |
| 1,915,425 | Kloepfer | June 27, 1933 |
| 1,971,009 | Konig | Aug. 21, 1934 |

FOREIGN PATENTS

| | | |
|---|---|---|
| 339,220 | Great Britain | Dec. 4, 1930 |
| 339,371 | Great Britain | Dec. 11, 1930 |
| 359,559 | Great Britain | Oct. 26, 1931 |
| 590,232 | Germany | July 11, 1930 |
| 39,282 | France | Oct. 12, 1931 |
| | (Addition to No. 695,497) | |
| 713,520 | France | Oct. 29, 1931 |

OTHER REFERENCES

Perret et al., "Helv. Chim. Acta," vol. 15, pages 1009–22 (1932), cited from Chem. Abstracts, vol. 27, page 473 (1933).

Chemical Abstracts, Decennial Index, 1927–1936 (vol. 21–30). Subject Index E-O. Page 5783, col. 3.